United States Patent
Jiang (10) Patent No.: US 9,103,948 B2
(45) Date of Patent: Aug. 11, 2015

(54) FIBER BYPASS MODULE AND ITS ADAPTED IN-LINE EQUIPMENT

(71) Applicant: Sean Jiang, Kaohsiung (TW)

(72) Inventor: Sean Jiang, Kaohsiung (TW)

( * ) Notice: Subject to any disclaimer, the term of this patent is extended or adjusted under 35 U.S.C. 154(b) by 119 days.

(21) Appl. No.: 14/102,821

(22) Filed: Dec. 11, 2013

(65) Prior Publication Data

US 2014/0205285 A1 Jul. 24, 2014

(30) Foreign Application Priority Data

Dec. 13, 2012 (CN) .......................... 2012 1 0538330
Feb. 25, 2013 (TW) .............................. 102106615 U (51) Int. Cl.
*G02B 6/00* (2006.01)
*G02B 6/42* (2006.01)
*G02B 6/35* (2006.01)
*H04Q 1/00* (2006.01)

(52) U.S. Cl.
CPC ................ *G02B 6/00* (2013.01); *G02B 6/3562* (2013.01); *G02B 6/4246* (2013.01); *H04Q 1/00* (2013.01); *H04J 2203/0012* (2013.01)

(58) Field of Classification Search
CPC . H04J 14/0216; H04J 14/0219; H04J 14/022; H04J 2203/0012
See application file for complete search history.

(56) References Cited

U.S. PATENT DOCUMENTS

| 6,288,813 | B1 * | 9/2001 | Kirkpatrick et al. .......... 398/136 |
| 6,441,931 | B1 * | 8/2002 | Moskovich et al. .............. 398/9 |
| 6,647,174 | B2 * | 11/2003 | Gooding et al. ................ 385/18 |
| 6,665,465 | B2 * | 12/2003 | Chang .............................. 385/22 |
| 6,751,699 | B1 * | 6/2004 | Langley et al. ................ 710/317 |
| 7,010,233 | B2 * | 3/2006 | Lindblad ........................ 398/164 |
| 7,433,572 | B2 * | 10/2008 | Young ............................ 385/144 |
| 7,542,681 | B2 * | 6/2009 | Cornell et al. .................. 398/139 |
| 8,121,478 | B2 * | 2/2012 | Kash et al. ....................... 398/50 |
| 2006/0051015 | A1 * | 3/2006 | Look ............................... 385/24 |
| 2014/0205285 | A1 * | 7/2014 | Jiang ............................... 398/45 |
| 2014/0241718 | A1 * | 8/2014 | Jiang ............................... 398/48 |
| 2014/0286636 | A1 * | 9/2014 | Jiang et al. ...................... 398/45 |

* cited by examiner

*Primary Examiner* — Rhonda Peace
(74) *Attorney, Agent, or Firm* — Chun-Ming Shih (57) ABSTRACT

A fiber bypass module and its adapted in-line equipment are provided. The fiber bypass module has an optical switch, a plurality of connectors, and a circuit substrate with an electrical signal control connector exposed. The electrical signal control connector may be plugged to the socket of the in-line equipment to receive the electrical control signal sent from the in-line equipment. The optical switch is provided on the circuit substrate and the electrical signal control connector is electrically connected with the optical switch such that the received electrical control signal is transmitted to the optical switch to execute the switching mode of the optical switch. Each of the plurality of connectors may be extended remotely to connect optical transceivers and optical network equipments, so that the optical transceivers and the fiber network equipments do not have to be provided at the same place as the in-line equipment.

9 Claims, 10 Drawing Sheets prior art

FIBER BYPASS MODULE AND ITS ADAPTED IN-LINE EQUIPMENT

CROSS-REFERENCE TO RELATED APPLICATIONS

This application claims the priority of China Patent Application No. 201210538330.7 filed on Dec. 13, 2012, in the State Intellectual Property Office of the P.R.C., and claims the priority of Republic of China Patent Application No. 102106615 filed on Feb. 25, 2013, in the State Intellectual Property Office of the R.O.C., the disclosure of which is incorporated herein by reference.

BACKGROUND OF THE INVENTION

1. Field of the Invention

The invention relates to an optical switch and an in-line equipment adapted thereto. More specifically, this is a fiber bypass module capable of connecting to the in-line equipment and the in-line equipment for it to connect.

2. Descriptions of the Related Art

With the rapid development of network technology, conventional copper cables for signal transmission are replaced with optical cables gradually. Compared to conventional copper cables, optical cables not only have advantages of small size and immunity from electromagnetic interference, but also can provide rapid and large signal transmission. Therefore, optical network technologies using optical cables as the media for signal transmission are applied to various industries and communications between equipments widely.

Optical switch is a necessary device in an optical network application. Optical switch is one of the important elements in an optical fiber communication network to switch optical signals in the optical network for adjusting optical paths of optical signals. In general, a fiber bypass module has a built-in optical transceiver (otherwise known as O/E Converter), and is provided with multiple optical cables for transmitting optical signal extended therein. The so called optical transceiver may convert an electrical signal into an optical signal for transmission to the optical network equipment through the optical cables provided in the fiber bypass module, and convert a received optical signal into an electrical signal to be transmitted to the in-line equipment. The so called fiber bypass module is connected to the in-line equipment electrically, and is coupled with the optical transceiver and the optical network equipment, respectively, for receiving the signal from the in-line equipment to turn on and off optical signal connection between the optical transceiver and the external optical network equipment. The built-in of the optical transceiver in the fiber bypass module will cause that the manufacturing cost of the fiber bypass module cannot be reduced effectively, and the brand and hardware specification of the optical transceiver in the fiber bypass module cannot be changed arbitrarily.

Figure 1:
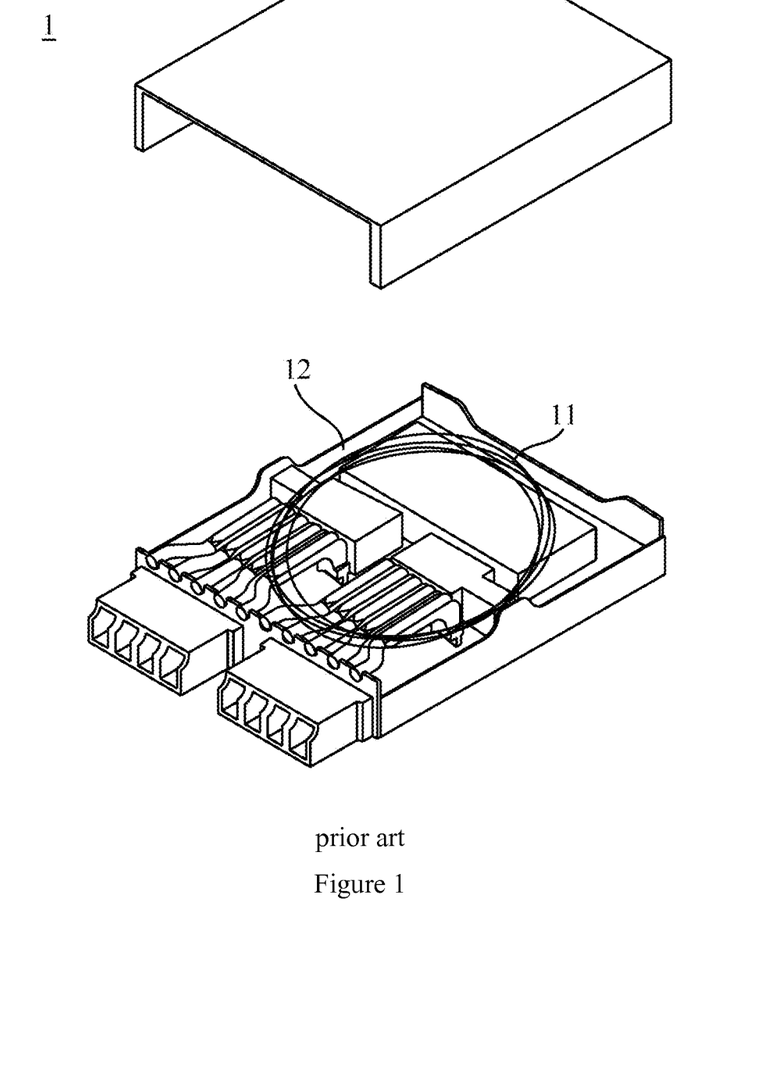
FIG. 1 is a schematic view showing the cable routing of optical cable in conventional fiber bypass module.

However, because optical signal is transmitted in optical cable with optical refraction and reflection, the optical cable in the fiber bypass module should have a certain degree of bending radius (in terms of EAI/TIA 568 regulation, the bending radius of multi-mode optical cable shall not be smaller than 25 mm), such that the optical signal may be transmitted in the optical cable continuously without attenuation. As shown in FIG. 1, a fiber bypass module 1 is wound with multiple rounds of optical cables 11, each of the optical cables 11 is wound along an inner housing 12 of the fiber bypass module 1 or on a cable tray (not shown) to change the direction of the optical cable for the bending radius of the optical cable to comply with the standard. Therefore, the size of the fiber bypass module cannot be reduced.

Further, an fiber bypass module has to keep electrical connection with an in-line equipment to receive the signal from the in-line equipment. Therefore, the fiber bypass module is usually arranged in an equipment casing of the in-line equipment. As such, a reserved space in the equipment casing of the in-line equipment is necessary for arranging the fiber bypass module, which size cannot be reduced, such that there is difficulty in arranging and utilizing the internal space of the in-line equipment.

From above, it is the problems that those skilled in the art have to solved urgently about how to arrange a fiber bypass module outside in-line equipment, and keep electrical connection with the in-line equipment.

SUMMARY OF THE INVENTION

In view of problems in prior technologies, one objective of the invention is to provide a fiber bypass module, which does not occupy an internal space of an in-line equipment, to improve flexibility of arrangement and application for the internal space of the in-line equipment.

A secondary objective of the invention is to provide a fiber bypass module with connectors capable of connecting to an optical transceiver and an optical network equipment, respectively. The connectors may be extended to remote to connect the optical transceiver and the optical network equipment, such that the optical transceiver and the optical network equipment do not have to be arranged necessarily in the same cabinet/rack.

To achieve the above and other objectives, the invention proposes a fiber bypass module. The fiber bypass module may connect an in-line equipment, and can couple multiple sets of external corresponding optical transceivers and optical network equipments. The fiber bypass module is inclusive of an outer housing, an optical switch, multiple connectors for optical transceiver and multiple connectors for optical network equipment. The outer housing is provided with a circuit substrate having an signal control connector, said signal control connector exposing outside said outer housing to connect to a socket of said in-line equipment for receiving an electrical control signal sent by said in-line equipment. The optical switch is provided on said circuit substrate, and couples or extends multiple optical fibers for optical transceiver and optical fibers for network equipment with corresponding relationship, the optical fibers for optical transceiver and the optical fibers for network equipment extending at least in interior of said outer housing. Said signal control connector connects with said optical switch electrically for the received electrical control signal to drive the said optical switch to execute all the modes of said optical switch. The multiple connectors for optical transceiver are provided external to said outer housing, one ends being capable of connecting one of said optical transceivers, respectively, the other ends coupling one of the optical fibers for optical switch, respectively. The multiple connectors for optical network equipment are provided external to said outer housing, one ends being capable of connecting each of said optical network equipments, respectively, the other ends coupling one of the optical fibers for optical switch, respectively.

Said optical switch is capable of executing a normal mode for optical signals of each of said optical fibers for network equipment and the corresponding optical fibers for optical transceiver to connect; or, said optical switch is capable of executing a bypass mode for connection of optical signals between each of said optical fibers for network equipment and the corresponding optical fibers for optical transceiver to be disconnected, and for optical signals between each of said optical fibers for network equipment to be connected.

The optical switches may be Dual2×2 bypass optical switch, Dual2×2 full optical switch or 4×8 optical switch. It is noted that the 4×8 optical switch mentioned above has multiple bypass fibers continued in pair by splicing or mechanical manner to perform bypass function. The outer housing of above fiber bypass module may also expose an indicator to indicate optical signal connection status of the optical cables for network equipment and the corresponding optical cables for optical transceiver, or indicate optical signal connection status between the optical cables for network equipment. The optical fibers for the network equipment and/or the optical transceiver may be routed in interior of an outer housing to change extension direction of cable routing. The outer housing is extended outwards with a hollow sleeve for passing through the optical fibers for network equipment or the optical fibers for optical transceiver for the exterior of the outer housing to form an optical cable for network equipment or an optical cable for optical transceiver. The optical cable for network equipment and the optical cable for optical transceiver may be gathered to be a ribbon. The optical fiber for network equipment and the optical fiber for optical transceiver may be covered with strength member. The so called strength member may be constructed an Armored Cable with the covered optical fiber. The strength member may also be made of materials selected from Kevlar Fiber or Aramid Fiber.

Connectors for optical transceiver and optical network equipment may be optical connectors in the form of ST, SC, FC, LC, MU or MPO. Signal control connector may be a connector in the form of USB, RJ45 or HDMI. Outer surface of the outer housing may be provided with a fixer, for example, locker such as screw, to fix the outer housing to the in-line equipment.

Furthermore, the invention proposes a fiber bypass module. The fiber bypass module may connect an in-line equipment, and can couple multiple sets of external corresponding optical transceivers and optical network equipments. The fiber bypass module includes a carrier, an optical switch, multiple connectors for optical transceiver and multiple connectors for optical network equipment. The carrier has an signal control connector, said signal control connector exposing outside to connect to a socket of said in-line equipment for receiving an electrical control signal sent by said in-line equipment. The optical switch is provided on said carrier, and couples or extends multiple optical cables for optical transceiver and optical cables for network equipment with corresponding relationship. Said signal control connector connects with said optical switch electrically for the received electrical control signal to be transmitted to said optical switch to execute the switching mode of said optical switch. The multiple connectors for optical transceiver are provided external to said carrier, one ends being capable of connecting one of said optical transceivers, respectively, the other ends coupling one of the optical cables for optical transceiver, respectively. The multiple connectors for optical network equipment are provided external to said carrier, one ends being capable of connecting one of said optical network equipments, respectively, the other ends coupling one of the optical cables for network equipment, respectively. Said optical switch is capable of executing a normal mode for optical signals of each of said optical cables for network equipment and the corresponding optical cables for optical transceiver to connect; or, said optical switch is capable of executing a bypass mode for connection of optical signals between each of said optical cables for network equipment and the corresponding optical cables for optical transceiver to be disconnected, and for optical signals between each of said optical cables for network equipment to be connected.

The optical cable for optical transceiver and the optical cable for network equipment may be, for example, loose tube optical cable or the optical cable with the strength members of Kevlar Fiber or Aramid Fiber. The carrier may also expose an indicator to indicate optical signal connection status of the optical cables for network equipment and the corresponding optical cables for optical transceiver, or indicate optical signal connection status between the optical cables for network equipment. The fiber bypass module of the invention may also be provided with a management unit, which is used to monitor the operation state of the in-line equipment. As the in-line equipment is monitored as operated normally, the in-line equipment may be monitored continuously. As the in-line equipment is monitored as operated abnormally, the operating system of the in-line equipment may be restarted. In another implementation form of the invention, the management unit may connect the optical switch and the in-line equipment. As the operation of the in-line equipment is monitored to be changed from abnormal to normal, the management unit may send a first control command to the optical switch for the optical switch to execute the normal mode. As the operation of the in-line equipment is monitored to be changed from normal to abnormal, the management unit may send a second control command to the optical switch for the optical switch to execute the bypass mode.

Furthermore, the invention proposes an in-line equipment for the fiber bypass module which is characterized in that a signal control socket for connecting said signal control connector is exposed.

Moreover, the invention provides a fiber bypass module with ports for optical transceiver and ports for network equipment exposing from the aforementioned outer housing or carrier to replace aforementioned connectors for optical transceiver and connectors for optical network equipment, so that the optical transceivers and the optical network equipments may be coupled by fan-out equipment with, for example, MTP/MPO interfaces.

In conclusion, the invention provides a fiber bypass module connected to an in-line equipment and the in-line equipment adapted thereto. A signal control connector of the fiber bypass module is exposed to be connected to the in-line equipment such that the objectives of placing the fiber bypass module outside the in-line equipment and keeping electrical connection with the in-line equipment are achieved. The fiber bypass module further has multiple connectors extendable to remote to connect external multiple sets of corresponding optical transceivers and optical network equipments, respectively. As such, it is not necessary for the optical transceiver to be embedded into an identical housing of fiber bypass module. Compared to conventional knowledge, the fiber bypass module of the invention has no built-in optical transceiver such that the manufacturing cost may be reduced from the viewpoint of ODM BOM cost and optical transceivers of various brands and hardware specifications may be changeable to increase the wide applicability of the product.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

To reduce manufacturing cost and occupied space of fiber bypass module, the fiber bypass module of the invention has no built-in optical transceiver, so that users may select suitable optical transceiver in terms of the requirement of hardware specification. The fiber bypass module of the invention may be inserted or removed by customer's own on an in-line equipment without being embedded in the in-line equipment, such that usable space inside the in-line equipment may be increased. Correspondingly, the invention further provides an in-line equipment with exposed signal control socket for connecting the fiber bypass module.

Figure 2:
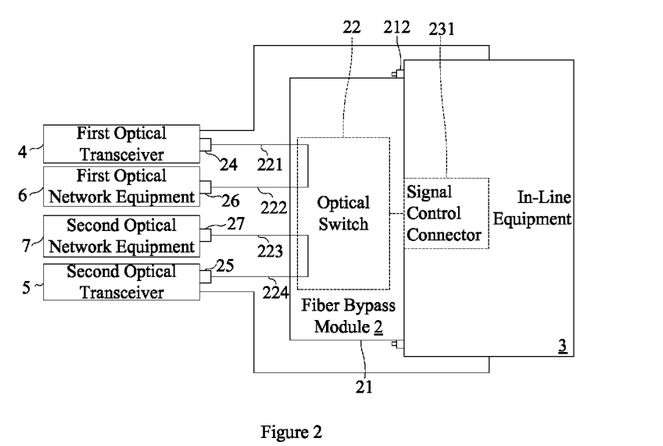
FIG. 2 is a block diagram showing the utilization of a fiber bypass module of the invention to connect optical network equipments and optical transceivers corresponding thereto.
Figure 3:
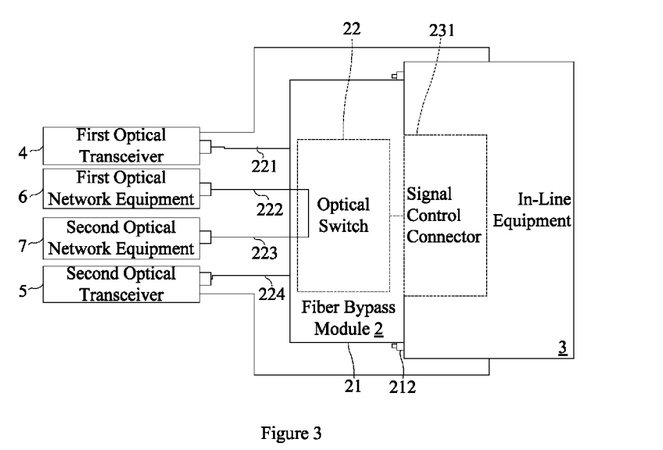
FIG. 3 is a block diagram showing the utilization of the fiber bypass module to connect various optical network equipments.

Refer to FIGS. 2 to 3, which are schematic views showing usage states of the fiber bypass module of the invention. As shown in FIG. 2, the fiber bypass module 2 of the invention may be connected to a socket on an equipment casing of an in-line equipment 3 to receive electrical control signal sent by the in-line equipment 3. The fiber bypass module 2 is provided with a first, a second connector 24, 25 for optical transceiver and a first, a second connector for optical network equipment 26, 27, the connectors 24, 25, 26, 27 may be inserted and coupled with a first, a second optical transceiver 4, 5 and a first, a second optical network equipments 6, 7, respectively, wherein, the first, the second optical transceivers 4, 5 corresponds to the first, the second optical network equipments 6, 7 to perform conversion of optical and electrical signals. As the in-line equipment 3 operates normally, an optical switch 22 in the fiber bypass module 2 may execute in a normal mode for the first, the second optical network equipments 6, 7 to connect with the corresponding first, second optical transceivers 4, 5. At the same time, the optical signals of the first, second optical network devices 6, 7 may be converted into to corresponding electrical signals through the first, second optical transceivers 4, 5, and be transmitted the converted electrical signals to the in-line equipment 3 for process. The first, second optical transceivers 4,5 may also convert electrical signals provided by the in-line equipment 3 into corresponding optical signals for transmitting to the first, second optical network equipments 6, 7.

As shown in FIG. 3, as the in-line equipment 3 is crashed, hang or power failure, the fiber bypass module 2 may execute a bypass mode, in which the fiber bypass module 2 may block optical signal connections between the first, second optical network equipments 6, 7 and the corresponding first, second optical transceivers 4, 5 for the first, second optical network equipments 6, 7 to connect and transmit optical signals with each other to form the function of optical bypass. Therefore, even though the in-line equipment 3 stops operation, the optical signals of the first, second optical network equipments 6,7 may still be transmitted through the fiber bypass module 2 with each other without blocking signal transmission in network system.

Figure 4:
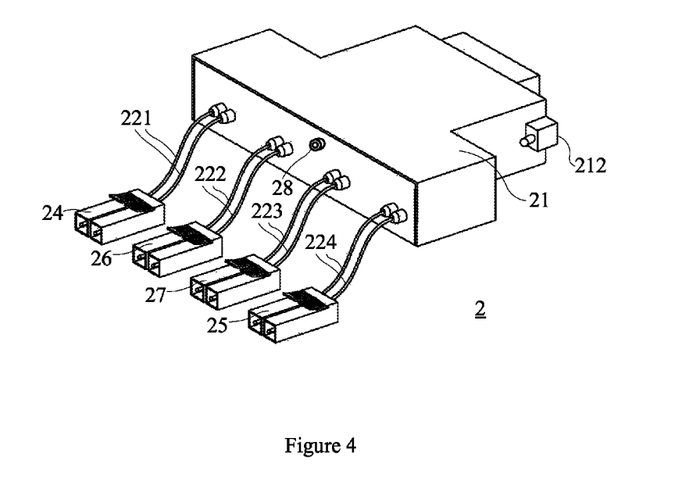
FIG. 4 is an outside view of one implementation form for the fiber bypass module of the invention.
Figure 5:
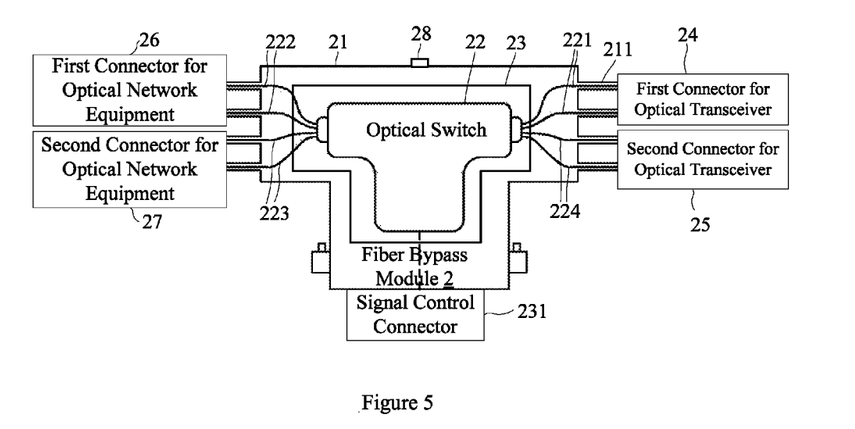
FIG. 5 is a block diagram of a system for the fiber bypass module of the invention.

Refer to FIGS. 4 and 5 for the structure of the fiber bypass module of the invention. As shown in the figures, the fiber bypass module 2 has an outer housing 21, an optical switch 22, a first, a second connectors 24, 25 for optical transceiver and a first, a second connectors 26, 27 for optical network equipment. The first, second connectors 24, 25 for optical transceiver and the first, second connectors 26, 27 for optical network equipment may be optical connector in the form of ST, SC, FC, LC, MU or MPO. The outer housing 21 is provided with a circuit substrate 23 with a signal control connector 231, which may be extended outside the outer housing 21 The signal control connector 231 may be a connector in the form of USB, RJ45 or HDMI to be connected to external in-line equipment (not shown) for receiving an electrical control signal sent to the optical switch 22 from the in-line equipment. The signal control connector 231 has electrical connection relationship with the optical switch 22 to transmit the electrical control signal received from the in-line equipment to the optical switch 22 to execute the switching mode of the optical switch 22. Specifically, the execution mode of the optical switch 22 may be changed to normal mode or bypass mode.

The outer housing 21 mentioned above may be made of material, for example, such as metal to provide the effect of screening electromagnetic interference (electromagnetic disturbance, EMI). Outer surface of the outer housing 21 is extended with a fixer 212, which locks and fixes the outer housing 21 to the in-line equipment 3 by locking with locker such as, for example, screw, to keep connection relationship between the signal control connector 231 and the in-line equipment 3. The outer surface of the outer housing 21 may also form an indicator (not shown) to indicate the execution mode of the optical switch 22.

Figure 6A:
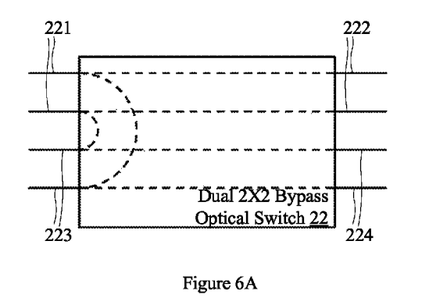
FIGS. 6A to 6C show various optical switch models for the fiber bypass module of the invention.
Figure 6B:
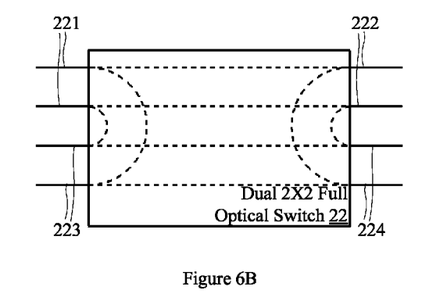
Figure 6C:
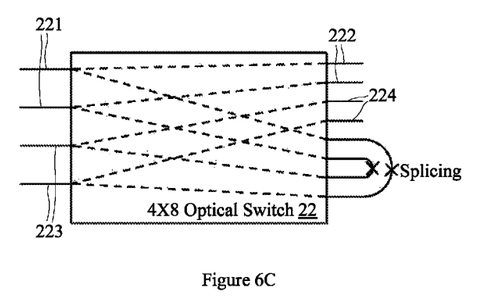

The optical switch 22 is provided on the circuit substrate 23, and is coupled or extended with a first, a second optical fibers 221, 224 for optical transceiver and a first, a second optical fibers 222, 223 for network equipment as optical paths for optical signals. The invention may select various types of optical switches, for example, Dual2×2 bypass optical switch, Dual2×2 full optical switch or 4×8 optical switch (Quad 1×2 optical switch), as shown in FIGS. 6A, 6B, 6C. It is noted that the 4×8 optical switch mentioned above has multiple bypass fibers continued in pair by splicing or mechanical splicer to perform the bypass function.

Figure 9:
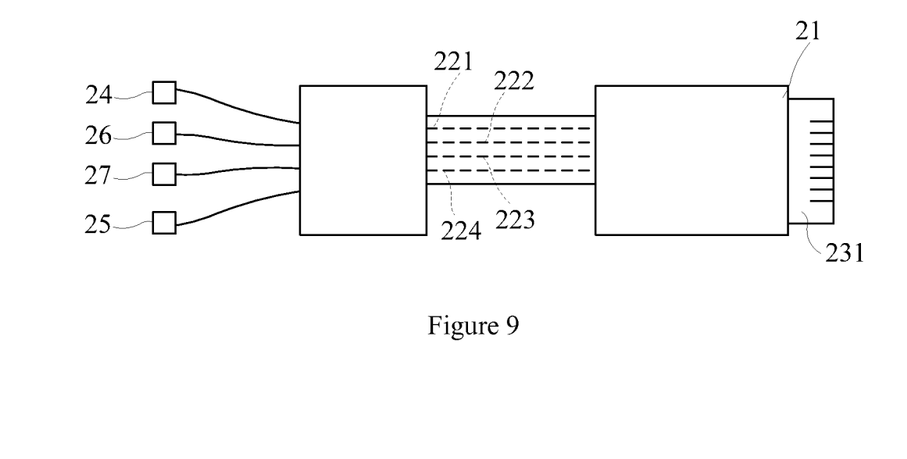
FIG. 9 is a schematic view showing an outlook for the fiber bypass module of the invention.

The first, second optical fibers 221, 224 for optical transceiver correspond to the first, second optical fibers 222, 223 for network equipment to provide connection between the first, second optical network equipments 6, 7 and the corresponding first, second optical transceivers 4, 5, respectively. As shown in FIG. 5, the outer housing 21 is extended outwards with a hollow sleeves 211 for passing through the first, second optical fibers 222, 223 for network equipment and the first, second optical fibers 221, 224 for optical transceiver for the exterior of the outer housing 21, respectively, to form a first, a second optical cables for network equipment and a first, a second optical cables for optical transceiver, the first, second optical cables for network equipment and the first, second optical cables for optical transceiver may be ribbonized as a ribbon, as shown in FIG. 9. It is noted that the hollow sleeves 211 may protect the optical fibers 222, 223 for network equipment and the optical fibers 221, 224 for optical transceiver from damage due to external forces.

The optical fiber for network equipment and the optical fiber for optical transceiver may be covered with strength member. The so called strength member may be added with wave type steel belt or polyethylene layer to construct as an Armored Cable with the covered optical cable to prevent the covered optical cable from damage due to the impact of over large lateral pressure to achieve the purpose of optical cable protection. However, the so called strength member may also be made of materials selected from Kevlar Fiber or Aramid Fiber.

The first, second connectors 24, 25 for optical transceiver are provided outside the outer housing 21 to be connected to the corresponding optical transceivers, respectively. Also, the first, second connectors 24, 25 for optical transceiver are coupled with one of the first, second optical fibers 221, 224 for optical transceiver mentioned above, respectively. As such, the optical signals may be transmitted to optical transceivers sequentially through the mentioned optical fibers 221, 224 for optical transceiver, connectors 24, 25 for optical transceiver. The first, second connectors 26, 27 for optical network equipment are provided outside the outer housing 21 to be connected to the corresponding optical network equipments, respectively. Also, the first, second connectors 26, 27 for optical network are coupled with one of the mentioned first, second optical fibers 222, 223, respectively. As such, the optical signals transmitted by the mentioned optical fibers 222, 223 for network equipment may be transmitted to the corresponding optical network equipments through the first, second connectors 26, 27 for optical network equipment.

Figure 7:
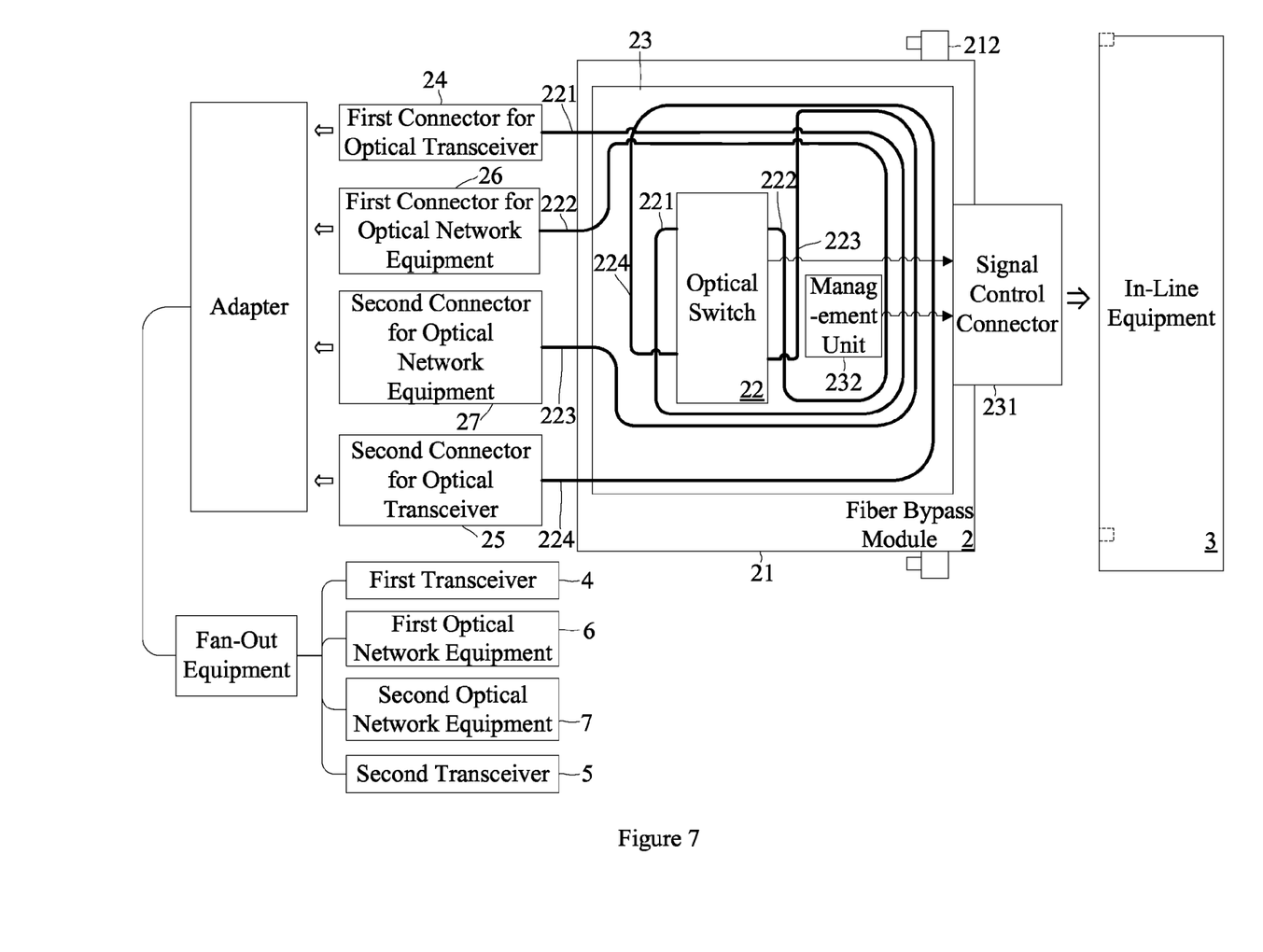
FIG. 7 is a block diagram showing a system for the first implementation form of the fiber bypass module of the invention.
Figure 8:
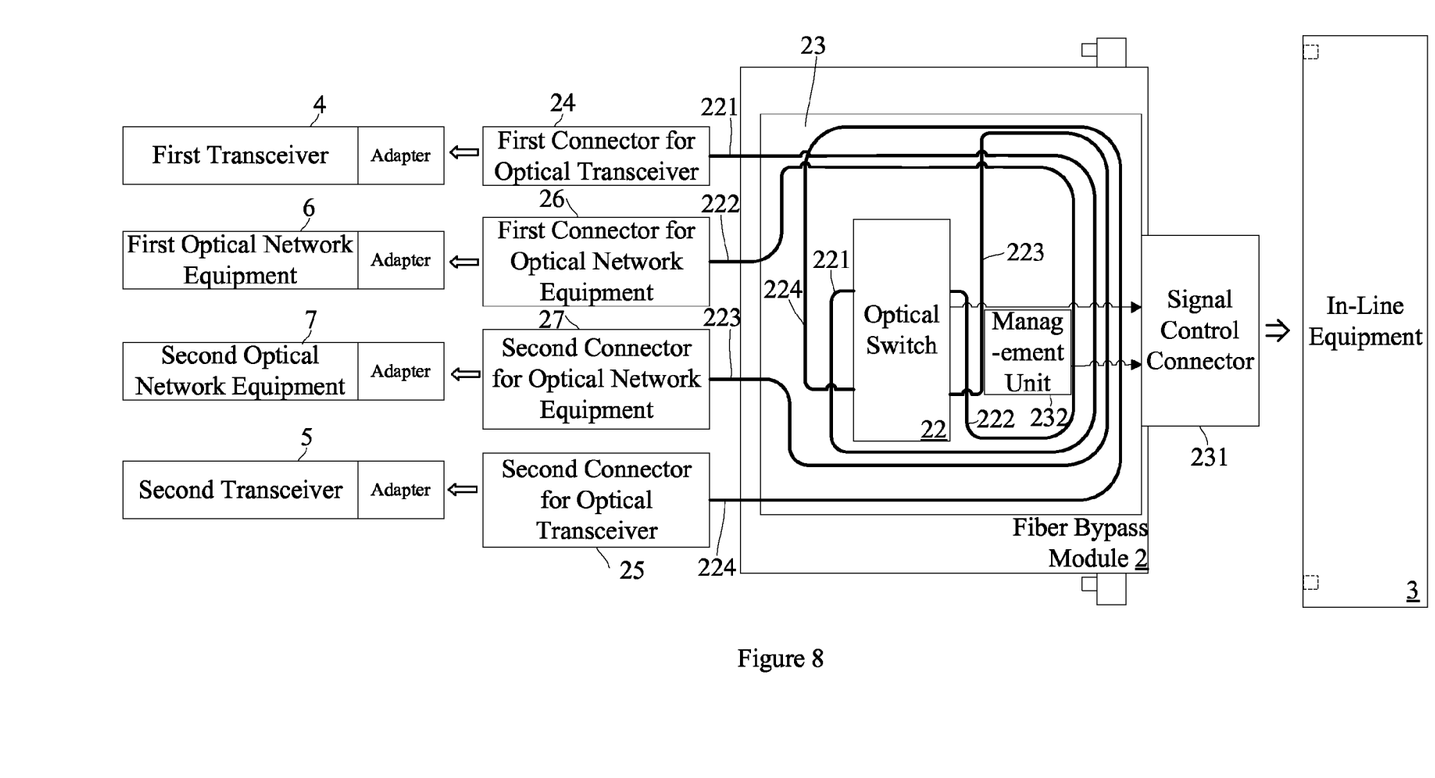
FIG. 8 is a block diagram showing a system for the second implementation form of the fiber bypass module of the invention.

In addition, refer to FIG. 7, FIG. 8, The first, second optical fibers 222, 223 for network equipment and/or the first, second optical fibers 221, 224 for optical transceiver may be routed in the interior of the outer housing 21 to change the direction of extent to adapt the locations of the first, second connectors 26, 27 for optical network equipment and the first, second connectors 24, 25 for optical transceiver. As shown in FIG. 7, each of the connectors 24, for optical transceiver and the connectors 26, 27 for optical network equipment may be connected to a fan-out equipment (Fan-Out Kits or Fan-Out Cable), respectively, and coupled with the first, second optical transceivers 4, 5 and the first, second optical network equipments 6, 7, respectively, but the invention is not limited thereto. The first, second connectors 24, 25 for optical transceiver and the first, second connectors 26, 27 for optical network equipment may also be connected directly to the first, second optical transceivers 4, 5 and the first, second optical network equipments 6, 7 to acquire coupling relationships, respectively, as shown in FIG. 8.

It is noted that the arrangement of the outer housing for the fiber bypass module in the invention may also be removed to expose the circuit substrate. As such, the optical switch mounted in the circuit substrate may be coupled or extended with multiple corresponding optical cables for optical transceiver and optical cables for network equipment. Even more, carrying carrier may also be provided to replace the circuit substrate; electrical connection exists between the signal control connector and the optical switch, which may be mounted on the carrier. The optical cable for optical transceiver and the optical cable for network equipment may be, for example, loose tube optical cable or the optical cable with Kevlar Fiber or Aramid Fiber.

Figure 10:
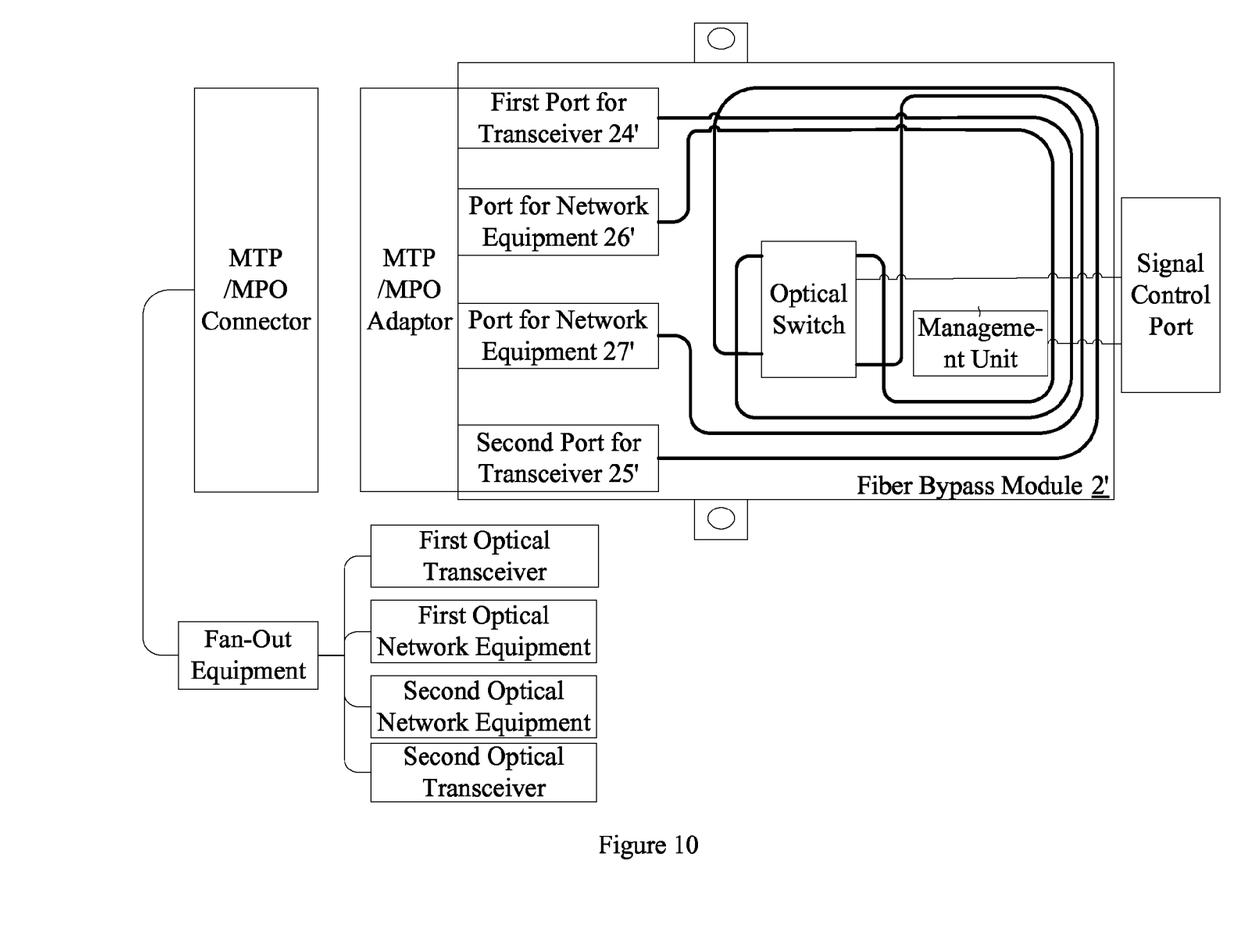
FIG. 10 is a block diagram showing a system for the third implementation form of the fiber bypass module of the invention.
Figure 11:
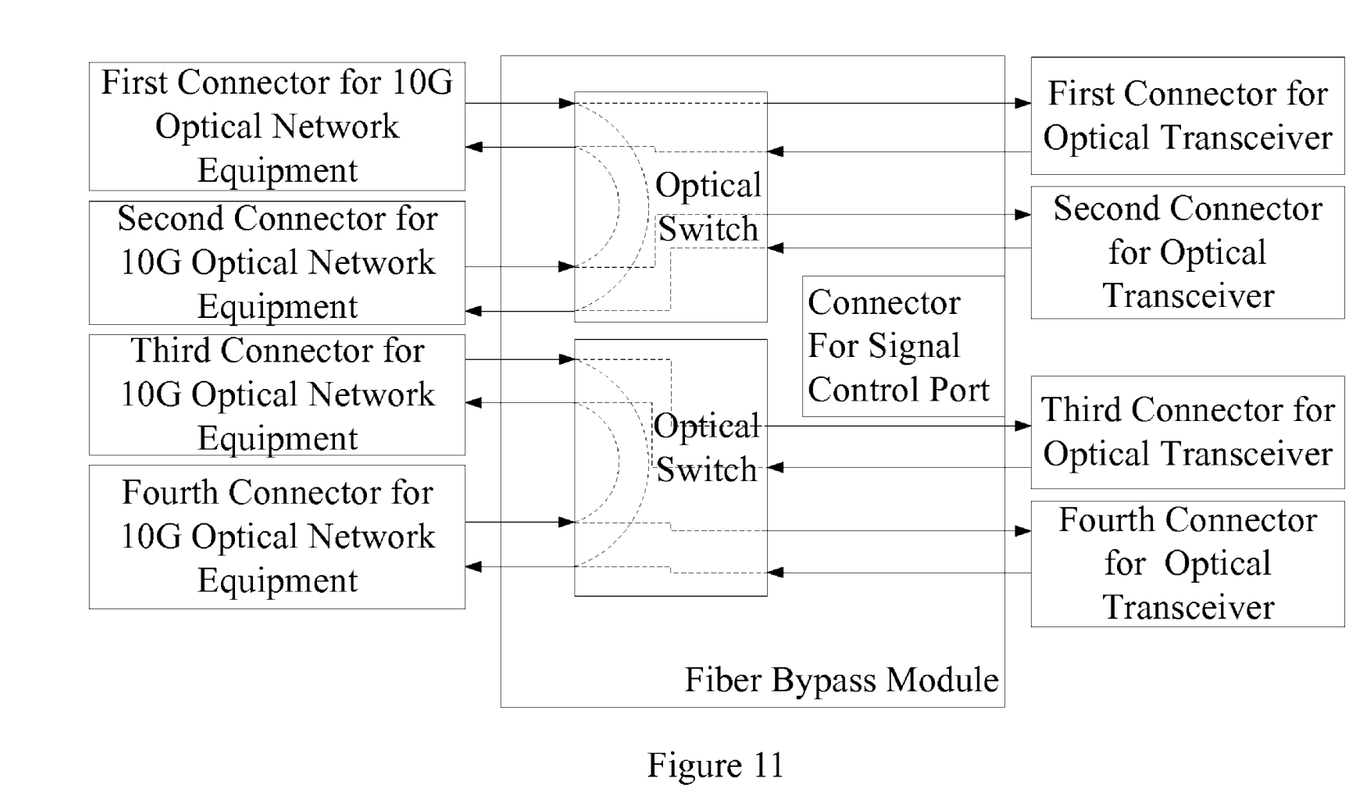
FIG. 11 is a block diagram showing a system for the fourth implementation form of the fiber bypass module of the invention.
Figure 12:
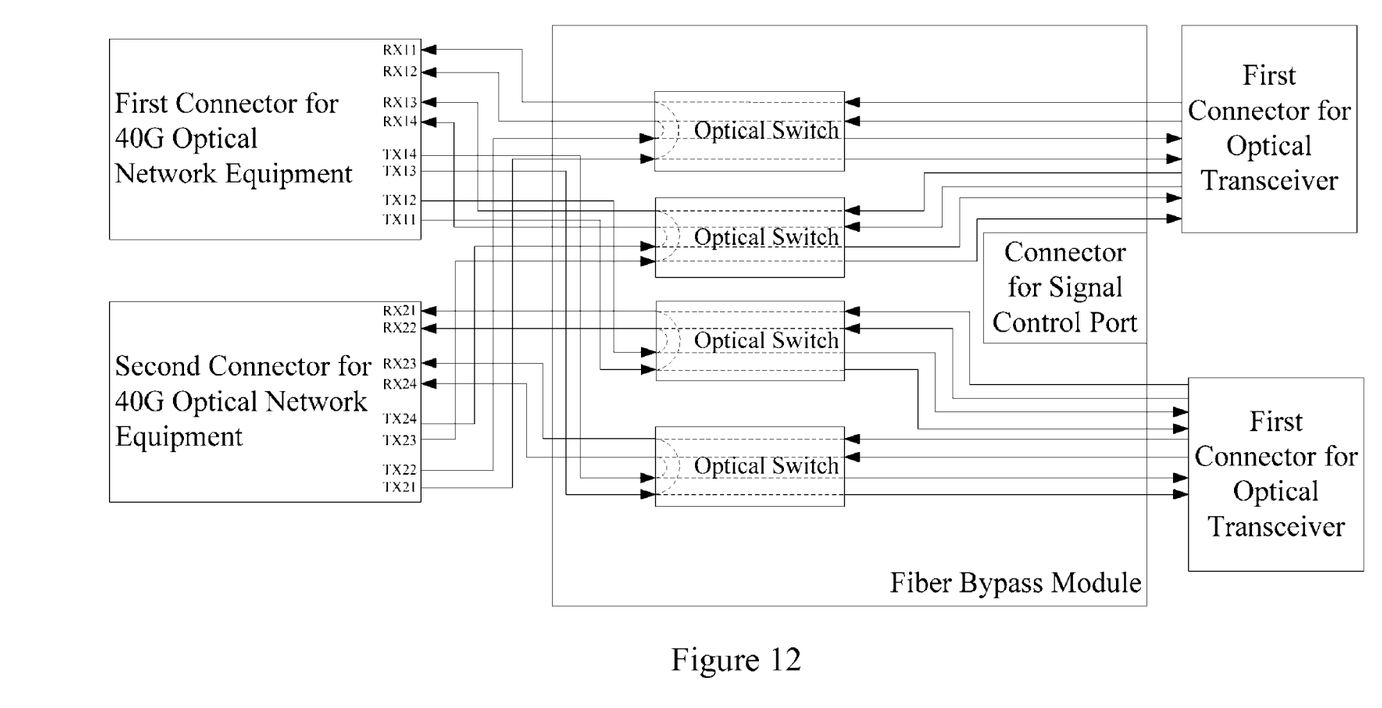
FIG. 12 is a block diagram showing a system for the fifth implementation form of the fiber bypass module of the invention.

Refer to FIG. 10, the invention also provides one fiber bypass module 2', which replaces the aforementioned first, second connectors 24, 25 for optical transceiver and the first, second connectors 26, 27 for optical network equipment with ports 24', 25' for optical transceiver and ports 26', 27' for network equipment exposing the aforementioned outer housing 21 or the carrier to couple optical transceivers and optical network equipments by fan-out equipments with, for example, MTO/MPO interfaces, respectively. The above circuit substrate or carrier may also expose an indicator to indicate optical signal connection status of the optical cables for network equipment and the corresponding optical cables for optical transceiver, or indicate optical signal connection status between the optical cables for network equipment. In addition, the optical transceiver device of the invention may also be used for 10 G optical network equipment (refer to FIG. 11) and 40 G optical network equipment (refer to FIG. 12).

The optical switch 22 may be a latching optical switch with switching signal trigger pin, the in-line equipment may input a trigger control signal to the optical switch 22 through the switching signal trigger pin by the signal control connector 231 to change the switching mode of the optical switch 22. The optical switch 22 may also be a non-latching optical switch with level detection pin. As the level detection pin detects a reset signal output due to crash of the in-line equipment or power failure through the signal control connector 231, the optical switch 22 may execute the bypass mode for the optical signals of each of the optical fibers for network equipment to connect with each other. As such, as the in-line equipment malfunctions, optical signal connections between multiple optical network equipments connected to the fiber bypass module 2 are maintained, such that the shortage with respect to disconnection of optical network due to power failure or crash of the in-line equipment may be prevented thereby.

As the optical switch 22 executes the normal mode, the optical switch 22 may connect the optical fibers 222, 223 for network equipment and the corresponding optical fibers 221, 224 for optical transceiver. As the optical switch 22 executes the bypass mode, the optical switch 22 may disconnect optical signal between the optical fibers 222, 223 for network equipment and the corresponding optical fibers 221, 224 for optical transceiver, and connect optical signal between the optical fibers 222, 223 for network equipment.

The fiber bypass module 2 of the invention may also be provided with a management unit 232, which is used to monitor the operation state of the in-line equipment 3. As the in-line equipment 3 is monitored as operated normally, the in-line equipment 3 may be monitored continuously. As the in-line equipment 3 is monitored as operated abnormally, the operating system of the in-line equipment 3 may be restarted through the signal control connector 231. In other words, the management unit 232 may monitor whether or not the in-line equipment 3 connected by the signal control connector 231 keeps abnormal for a period of time, such that the management unit 232 may awaken the in-line equipment 3 if yes, or the management unit 232 may keep on monitoring the in-line 3. The management unit 232 may be a watch dog timer (WDT) chip. The mentioned abnormal operation of the in-line equipment indicates the phenomena of the in-line equipment with respect to crash or power failure.

In another implementation form of the invention, the management unit 232 may connect the optical switch 22 and the in-line equipment 3. As the operation of the in-line equipment 3 is monitored to be changed from abnormal to normal, the management unit 232 may send a first control command to the optical switch 22 for the optical switch 22 to execute the normal mode. As the operation of the in-line equipment 3 is monitored to be changed from normal to abnormal, the management unit 232 may send a second control instruction to the optical switch 22 for the optical switch 22 to execute the bypass mode and/or restarting the operation system of the in-line equipment. It is noted that the management unit 232 may be neglected to save the entire BOM (bill of materials) cost in correspondence to customer request, and is not a necessary element.

For operators to handle the switching mode of the optical switch 22 effectively, as shown in FIG. 4, the fiber bypass module 2 of the invention may also be provided with an indicator 28 exposing to the outer housing 21 to indicate the connection state between the optical fibers 222, 223 for network equipment and the corresponding optical fibers 221, 224 for optical transceiver, or indicate the connection state between the optical fibers 222, 223 for network equipment. The mentioned indicator 29 is, for example, a LED indicator. Refer to FIG. 9, portions of the optical fibers 222, 223 for network equipment and the corresponding optical fibers 221, 224 for optical transceiver may be ribbonized as a ribbon for the entire fiber bypass module 2 to appear as a stripped cable shape to reduce occupied space and adapt various application environments.

Compared to conventional technology, the fiber bypass module of the invention has the follow technical features to figure out the problems faced by those skilled in the art.

1. A fiber bypass module is provided to be capable of connection to an in-line equipment so that no space has to be reserved to arrange the fiber bypass module in the in-line equipment.

2. The fiber bypass module does not need to be provided with built-in optical transceiver so that the BOM cost may be reduced, and optical transceivers of different brands and hardware specifications may be changeable to improve wide application of the product.

3. Connectors are provided to connect optical transceivers and optical network equipments, respectively, to form a network architecture with the in-line equipment.

4. The connectors of the optical transceivers and the optical network equipments may be extended to remote, such that the optical transceivers and the optical network equipment do not have to be arranged with the in-line equipment in one identical place.

What is claimed is:

1. A fiber bypass module, which may connect in-line equipment, and may couple multiple sets of external corresponding optical transceivers and optical network equipments, including:
    an outer housing, which is provided with a circuit substrate having an signal control connector, said signal control connector exposing outside said outer housing to connect to a socket of said in-line equipment for receiving an electrical control signal sent by said in-line equipment;
    an optical switch, which is provided on said circuit substrate, and couples or extends multiple optical fibers for optical transceiver and optical fibers for network equipment with corresponding relationship, the optical fibers for optical transceiver and the optical fibers for network equipment extending at least in housing interior of said outer housing; said signal control connector connecting with said optical switch electrically for the received electrical control signal to be transmitted to said optical switch to execute the switching mode of said optical switch;
    multiple connectors for optical transceiver, which are provided external to said outer housing, one ends being capable of connecting one of said optical transceivers, respectively, the other ends coupling one of the optical fibers for optical transceiver, respectively; and
    multiple connectors for optical network equipment, which are provided external to said outer housing, one ends being capable of connecting one of said optical network equipments, respectively, the other ends coupling one of the optical fibers for network equipment, respectively; said optical switch being capable of executing a normal mode for optical signals of each of said optical fibers for network equipment and the corresponding optical fibers for optical transceiver to connect; or, said optical switch being capable of executing a bypass mode for connection of optical signals between each of said optical fibers for network equipment and the corresponding optical fibers for optical transceiver to be disconnected, and for optical signals between each of said optical fibers for network equipment to be connected.

2. The fiber bypass module as claim 1, wherein, said outer housing is extended outside hollow sleeves for passing said optical fibers for network equipment and said optical fibers for optical transceiver, respectively, to form optical cables for network equipment and optical cables for optical transceiver outside said outer housing, respectively; said optical cables for network equipment and said optical cables for optical transceiver are gathered as a ribbon; the optical fiber for network equipment and the optical fiber for optical transceiver to be covered with covering; the covering is to be constructed as an Armored Cable with the covered optical cable, or at least to be made of materials selected from Kevlar Fiber or Aramid Fiber.

3. The fiber bypass module as claim 1, wherein, outer surface of said outer housing is provided with a fixer for fixing said outer housing to said in-line equipment; wherein, the optical switches may be Dual2×2 optical switch or 4×8 optical switch; wherein, the 4×8 optical switch has multiple bypass fibers continued in pair by splicing or mechanical splicer to perform bypass function.

4. An in-line equipment for the fiber bypass module as claim 1, which is characterized in that a signal control socket for connecting said signal control connector is exposed.

5. A fiber bypass module, which may connect in-line equipment, and may couple multiple sets of external corresponding optical transceivers and optical network equipments, including:
  a carrier, which has an signal control connector, said signal control connector exposing outside to connect to a socket of said in-line equipment for receiving an electrical control signal sent by said in-line equipment;
  an optical switch, which is provided on said carrier, and couples or extends multiple optical cables for optical transceiver and optical cables for network equipment with corresponding relationship, wherein said signal control connector is connected with said optical switch electrically for the received electrical control signal to be transmitted to said optical switch to execute the switching mode of said optical switch;
  multiple connectors for optical transceiver, which are provided external to said carrier, one ends being capable of connecting one of said optical transceivers, respectively, the other ends coupling one of the optical cables for optical transceiver, respectively; and
  multiple connectors for optical network equipment, which are provided external to said carrier, one ends being capable of connecting one of said optical network equipments, respectively, the other ends coupling one of the optical cables for network equipment, respectively; said optical switch being capable of executing a normal mode for optical signals of each of said optical cables for network equipment and the corresponding optical cables for optical transceiver to connect; or, said optical switch being capable of executing a bypass mode for connection of optical signals between each of said optical cables for network equipment and the corresponding optical cables for optical transceiver to be disconnected, and for optical signals between each of said optical cables for network equipment to be connected.

6. A fiber bypass module, which can connect an in-line equipment, and can couple multiple sets of external corresponding optical transceivers and optical network equipments, including:
  an outer housing, which mounts a circuit substrate with an optical switch and a signal control port, said signal control port exposing outside said outer housing and being capable of coupling the in-line equipment;
  multiple sets of ports for optical transceiver, one ends exposing outside said outer housing for coupling one set of said multiple sets of optical transceivers; the other ends coupling optical fiber for optical transceiver, said optical fiber for optical transceiver extending at least inside said outer housing until coupling with said optical switch; and
  multiple sets of ports for network equipment, one ends exposing outside said outer housing for coupling one of said multiple sets of optical network equipments, respectively; the other ends coupling with optical fiber for network equipment, said optical fiber for network equipment extending at least inside said outer housing until coupling said optical switch;
  wherein, said optical switch is capable of executing a normal mode for each of said optical network equipments to connect with the corresponding optical transceivers; or said optical switch is capable of executing a bypass mode for disconnecting the connection between each of said optical network equipments and the corresponding optical transceiver for each of said optical network equipments to connect and transmit optical signal with each other.

7. The fiber bypass module as claim 6, wherein, portions of said ports for optical transceiver and said ports for network equipment exposing said carrier form MTO or MPO connectors.

8. The fiber bypass module as claim 6, further containing a management unit for monitoring operation state of said in-line equipment, when said in-line equipment being monitored as operating normally, said in-line equipment being monitored continuously, or said optical switch executing the normal mode, when said in-line equipment being monitored as operating abnormally, operating system of said in-line equipment being restarted, or said optical switch executing the bypass mode.

9. A fiber bypass module, which may couple multiple sets of external corresponding optical transceivers and optical network equipments, including:
  a carrier, which has an optical switch and a signal control connector, said signal control connector exposing outside to connect to a socket of said in-line equipment;
  multiple ports for optical transceiver, one ends being exposed and being capable of connecting one of said optical transceivers, respectively, the other ends coupling one of optical cables for optical transceiver, respectively; the optical cables for optical transceiver extending until coupling with the optical switch; and
  multiple ports for optical network equipment, one ends being capable of connecting one of said optical network equipments, respectively, the other ends coupling one of the optical cables for network equipment, respectively, the optical cables for network equipment with extended until coupled with the optical switch; wherein,
  said optical switch being capable of executing a normal mode for optical signals of each of the network equipments and the corresponding optical transceivers to connect; or, said optical switch being capable of executing a bypass mode for connection of optical signals between each of the network equipments and the corresponding optical transceivers to be disconnected, and for optical signals between each of the network equipments to be connected.

* * * * *